A. J. COLLAR.
DITCH GATE.
APPLICATION FILED NOV. 13, 1909.
973,172.
Patented Oct. 18, 1910.
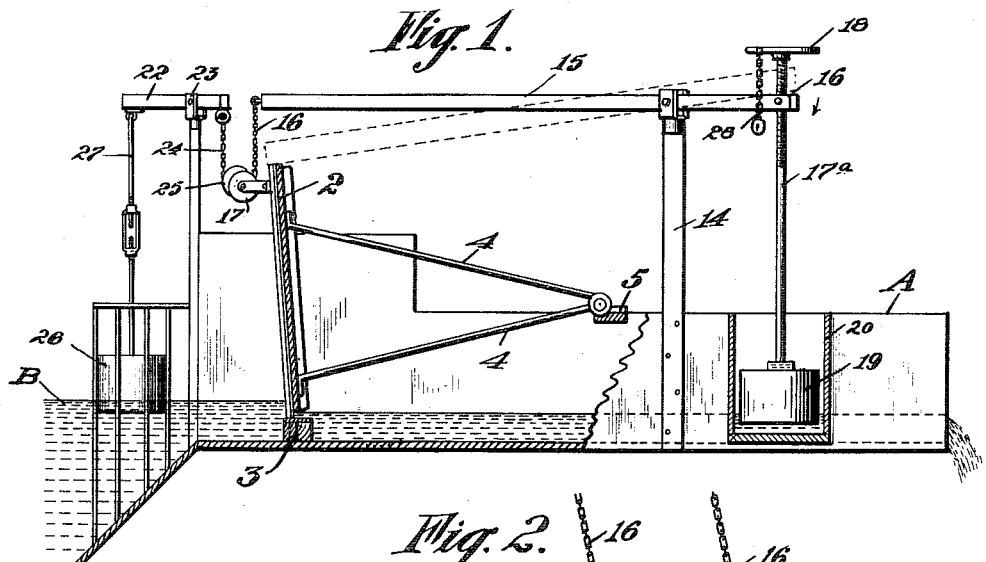
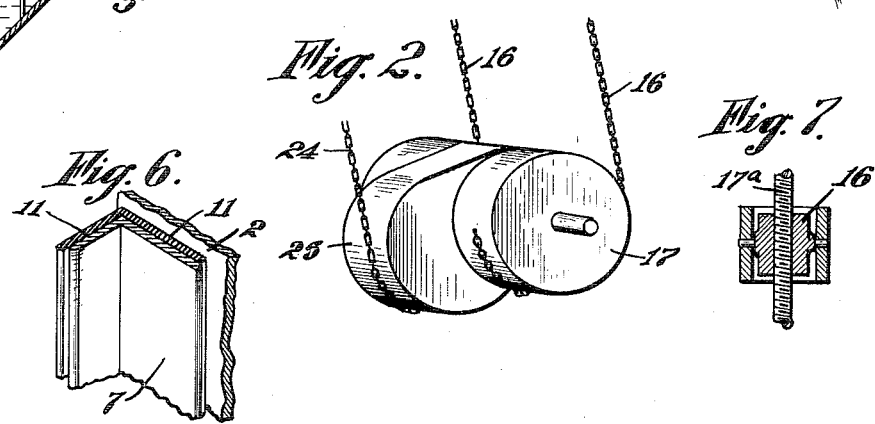
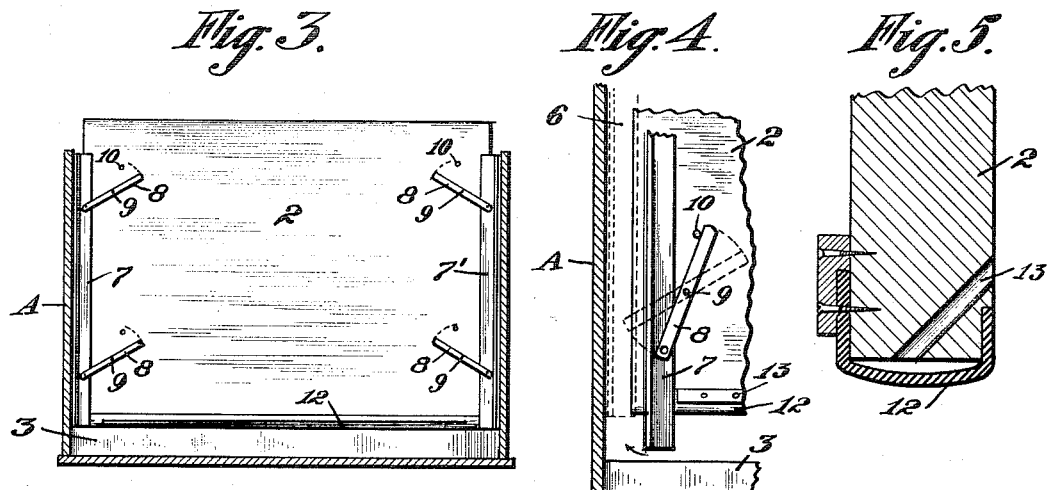
Witnesses:
R. S. Berry,
F. E. Maynard.
Inventor
Adoniram J. Collar
By Geo. H. Strong.
His Attorney.

UNITED STATES PATENT OFFICE.

ADONIRAM J. COLLAR, OF YREKA, CALIFORNIA.

DITCH-GATE.

973,172.  Specification of Letters Patent.  Patented Oct. 18, 1910.

Application filed November 13, 1909. Serial No. 527,816.

*To all whom it may concern:*

Be it known that I, ADONIRAM J. COLLAR, a citizen of the United States, residing at Yreka, in the county of Siskiyou and State of California, have invented new and useful Improvements in Ditch-Gates, of which the following is a specification.

This invention relates to adjustable and automatic ditch gates for regulating the flow of a body of water, and particularly pertains to ditch gates such as are installed at the heads of flumes, sluices and the like, where they join with a main canal, or other source of water supply.

It is the object of this invention to provide a ditch gate by means of which a uniform amount, and a constant flow of water may be delivered to a ditch, canal, or other channel, from a main source in which the flow is variable and fluctuating.

Another object is to provide a ditch gate which may be adjusted in such manner as to regulate the area of opening so that any predetermined quantity of water will be discharged therethrough during a given period of time, and which can be locked in an open or closed position.

A further object of this invention is to provide a gate which may be closed and locked, and which is so constructed as to make a perfectly tight closure so as to completely shut off the flow of water when desired.

The invention consists of the parts, and the combination and construction of parts as hereinafter more fully described and claimed, reference being had to the accompanying drawings, in which—

Figure 1 is a side view of the invention, partly in section. Fig. 2 is a detail in perspective of the differential drum. Fig. 3 is a front view of the ditch gate. Fig. 4 is a detail of the clamp packing bars on the ends of the gate, showing the open position. Fig. 5 is a detail in section of the lower edge of the gate. Fig. 6 is a perspective of the upper portion of a packing bar; and Fig. 7 is a detail of a wind bearing.

In the drawings, A is a flume connecting with a main canal B, and 2 is a gate interposed across the head of the flume and adapted to rest upon a shoe or stool 3, built across the bottom of the flume. The gate 2 has connected with it on the rear side, radius rods 4 of considerable length. These rods extend along the flume, and are hinged or pivoted to a fixed transverse bar 5, which forms a fulcrum around which the rods and the gate may rise and fall in an arc of a circle.

The gate 2 may be constructed of any desired material, and suitably braced and reinforced when the flume is wide, and as many radius rods 4 may be employed, as found expedient, but which are preferably mounted in pairs as shown in Fig. 1, with one rod connecting with the gate and brace ribs at a suitable point below the top of the gate, and the other at the bottom, and both converging to the hinge point so as to form a triangular brace which insures the rigidity of the gate of any dimensions, and its easy operation.

The end edges of the gate 2 are not in contact with the sides of the flume, a narrow space as at 6, Fig. 4, separating the gate and flume, so that the former may be freely moved up and down within the latter, without any friction. This space 6 is open when the gate is raised from its seat, and is closed when the gate is in its lowermost position by means of automatic packing bars 7—7' which are mounted on the front face of the gate at each end. These bars 7—7' consist of vertical angle irons which are pivotally mounted on and are suspended from rocking lever arms 8, which are pivoted at 9 to the gate 2 in such manner that the bars 7—7' may be moved up and against or down and away from the sides of the flume, so as to close or open the spaces 6. This is accomplished in the following manner: When the gate 2 is in a raised position, the bars 7—7' by virtue of their weight, are dropped down and away from the sides of the flume, as shown in Fig. 4 in full lines; this movement being permitted by the pivotal mountings of the bars 7—7' and levers 8. Stop pins 10 limit the downward movement of the bars 7—7'. When in this position the lower ends of the bars 7—7' project below the bottom edge of the gate 2, and when the gate is lowered, the ends of the bars 7—7' contact the upper face of the stool 3, and are lifted up and over against the face of the flume A, as shown in Fig. 3, and in dotted lines in Fig. 4. The outer or contacting faces of the angle bars 7—7' which bear against the sides of the flume and the front of the gate, are covered with a flexible packing 11, and the sides of the flume at the contacting point may be lined with a similar material, so that when the gate is closed and the packing bars 7—7' are clamped against the sides of the flume, a perfect water-tight joint is obtained.

The bottom edge of the gate 2 is provided with a packing strip as shown in Fig. 5, which consists of a flexible strap 12 which extends across the lower edge and up on each side of the gate 2, the portion projecting upon the front of the gate being preferably set in flush, as shown. Passages 13 are formed in the bottom edge of the gate, through which water is admitted to the space between the lower edge of the gate and the back of the packing strip 12, when the gate is submerged, thus forming a water cushion, and making a tight contact when the gate is closed, the flexibility of the cushion allowing it to conform to any unevenness in the slot 3, or the bottom edge of the gate 2.

At a suitable distance in the rear of the gate, and beside the flume, is a post 14, at the top of which is fulcrumed a beam 15. The end of the beam 15 which projects over the flume is connected to the gate 2 by means of chains 16, or other flexible connections, which are secured to the end of the beam and to the small sheaves 17 on the differential drum, shown in Fig. 2, which is mounted on the gate 2. The opposite end of the beam 15 is provided with a suitable swiveled and internally threaded bearing 16, shown in Fig. 7, through which the threaded portion of a vertical shaft 17$^a$ extends. The upper end of the shaft 17$^a$ has a hand-wheel 18, and the lower end is secured to a float 19 which is adapted to ride in a float box 20 on the side of the flume A, as in it. A beam 22 is disposed opposite the beam 15 in front of the gate 2, and is fulcrumed at 23. One end of the beam 22 is connected to the gate 2 by means of a chain 24 which is secured to the central eccentric sheave 25 of the differential drum. The other end of the beam 22 is connected by means of an adjustable rod 27 to a float 26 which rides in a crate or open cage in the main canal B. The float 22 is affected by the rise and fall of the water surface in the main canal.

In operation, it being desired to admit a certain volume or flow of water to the flume A, the gate 2 is opened by rotating the hand-wheel 18, so as to cause a downward pull on the short end of the beam 15 which moves the outer end of the beam upward. This causes the chains 16 to unwind from the drum 17 by revolving the latter in its bearings. This unwinding of the chains 16, and consequent rotation of the differential drum, causes the chain 24 to wind on the eccentric sheave 25, which is connected to the sheaves 17, thus pulling down on the short end of the lever 22. The length of wind of the chain 24 being greater than the unwind of the chains 16, causes an upward pull on the gate 2 by reason of the counter-weighted floats 19 and 26 exerting a downward pull on the outer ends of the lever beams 15 and 22. When the gate is sufficiently raised the hand-wheel 18 is locked in any suitable manner, such as a lock and chain 28. As the gate 2 is raised, the packing bars 7—7' drop away from the sides of the flume A, thus opening the spaces 6 whereupon a flow of water is caused to pass beneath and around the edges of the gate 2. The water in the flume A tends to raise the float 19, which depresses the long end of the beam 15 to lower the gate, so that when an excess of water is admitted to the flume, the gate 2 is automatically closed so as to lessen the area of the opening of the gate. Similarly, a raise of the surface of the water in the main canal B, tends to raise the float 26 and lower the gate 2, through the medium of the beam 22. In like manner, a fall of the water surface in either the flume or main canal will tend to open the gate wider and allow a greater volume of water to flow therethrough. The two diameters of the differential drum at 17 and 25, and the lengths of the lever arms of the beams 15 and 22 are so proportioned in ratio to each other, that an exact balance of the gate 2 is obtained, regardless of the set area of the gate opening. Thus, when the gate is raised, say one inch, from its seat, a volume of water will pass thereunder in a stream of like depth, regardless of the head of water in front of the gate. The greater the depth of water above the gate opening, the greater the quantity of water that will pass beneath the gate, and vice versa, therefore in order to maintain a uniform flow, the height of the gate from its seat must vary in proportion to the depth of water in the main canal above the gate opening. This is accomplished through the action of the float 26 and the eccentric drum 25 as before described. When it is desired to close and lock the gate, the long arm of the beam 15 is lowered by means of the hand-wheel 18, and threaded shaft 17$^a$ until the arm rests upon the top of the gate, which is in its lowermost position. The float 19 is then resting upon the floor of the float box 20. By locking the hand-wheel 18 against rotation, the beam 15 takes a fixed position, and prevents the raising of the gate.

Having thus described my invention, what I claim and desire to secure by Letters Patent is—

1. The combination with a flume or sluice, of a gate interposed across the head of the flume, a center of oscillation located behind the gate within the flume, radius connecting and brace rods, opposed fulcrumed levers each having one end connected with the gate, and floats with which the opposite ends of the levers are connected, one of said floats being raised and lowered by the rise and fall within the flume, and the other by the level of the water supplied to the flume.

2. The combination with a flume or sluice, of a gate interposed across the head of the flume, a center of oscillation located behind the gate within the flume, radius connecting and brace rods, opposed fulcrumed levers one having one arm connected with the gate and the other arm with a float within the influence of the flow in the flume, and the other having one arm connected with the gate and the other arm with a float within the influence of the water admitted to the flume.

3. The combination with a flume or sluice, of a gate interposed across the head of the flume, a center of oscillation located behind the gate within the flume, radius connecting and brace rods, opposed fulcrumed levers each having one end connected with the gate, one of which levers is adjustably connected with a float within the influence of the flow in the flume, and the other similarly connected with a float influenced by the level of the water supplied to the flume.

4. The combination with a flume or sluice, of a gate interposed across the head of the flume, a center of oscillation located behind the gate within the flume, radius connecting and brace rods, opposed fulcrumed levers having their outer ends connected with floats located respectively within the influence of the flow in the flume and the water supplied, a drum or sheave upon the gate with which the first named lever is flexibly connected, and a coacting eccentric or differential drum with which the second lever is similarly connected.

5. The combination with a flume or sluice, of a gate interposed across the head of the flume, a center of oscillation located behind the gate within the flume, radius connecting and brace rods, opposed fulcrumed levers having their outer ends connected with floats located respectively within the influence of the flow in the flume and that of the water supply, a circular drum carried by the gate, a flexible connection with the flume lever adapted to wind upon said drum, an eccentric drum turnable with the circular drum, and having a similar connection with the other lever whereby the movement of the floats is differentiated.

6. The combination with a flume or sluice, of a gate interposed across the head of the flume, a center of oscillation located behind the gate within the flume, radius connecting and brace rods, opposed fulcrumed levers having their outer ends connected with floats located respectively within the influence of the flow in the flume and that of the water supply, and means carried by the gate to differentiate the rise and fall of the floats.

7. The combination with a flume or sluice, of a gate interposed across the head of the flume, a center of oscillation located behind the gate within the flume, radius connecting and brace rods, opposed fulcrumed levers having their outer ends connected with floats located respectively within the influence of the flow in the flume and that of the water supply, and winding drums upon the gate turnable in unison, having flexible connections with the levers, and variably acting upon the floats and the gate.

8. The combination with a flume or sluice, of a gate interposed across the head of the flume, a center of oscillation located behind the gate within the flume, radius connecting and brace rods, and balancing levers and floats, and means to pack the edges of the gate when closed, said means including outwardly and inwardly movable packing strips, and means by which they are advanced and retracted.

9. The combination with a flume, of a vertically movable gate, packing bars carried by the vertical edges of the gate, fulcrumed levers to which the bars are pivoted, and means for moving the levers to advance or retract the bars with relation to the sides of the flume.

10. The combination with a flume, and a vertically movable gate therefor, of vertical packing bars, levers fulcrumed upon the edges of the gate adapted to carry said bars and allow them to drop away from the edges of the gate when the latter commences to rise, said bars and levers coacting when the gate is closed to force the bars outward, and form tight joints with the sides of the flume.

11. The combination with a flume, and a vertically movable gate therefor, of vertical packing bars, levers fulcrumed to the gate, to the ends of which levers the bars are pivoted so as to swing away from the sides of the flume when the gate begins to rise, the lower ends of the bars contacting with the bottom of the flume when the gate is closed, and the levers coacting therewith to force the bars outwardly and form tight joints with the flume sides.

12. The combination with a flume, and a rising and falling gate therefor, of vertical packing bars, with means for moving them outward when the gate is closed, and allowing them to be retracted when the gate is opened.

13. The combination with a flume, and a rising and falling gate therefor, of automatically operating packing bars to form joints with the sides of the flume, and packing strips, and a flexible packing strip forming a joint with the bottom of the flume.

14. The combination with a flume, and a vertically movable gate therefor, of a flexible packing strip fitting the lower edge of the gate, and a channel admitting water through the gate to the inner surface of the packing strip whereby it is distended to form a joint with the bottom.

15. The combination of a flume, a vertically movable gate located at the point of intersection of the flume with a main ditch, and controlling lever and float, of manually actuated means to close and lock the gate.

16. The combination of a flume, a gate vertically movable therein and located at the point of intersection of the flume with a main ditch, a fulcrumed lever having one end connected with the gate, a float and an unyielding connection with the opposite end of the lever, and means to secure the gate and float in their lowest position.

In testimony whereof I have hereunto set my hand in the presence of two subscribing witnesses.

ADONIRAM J. COLLAR.

Witnesses:
R. S. BERRY,
W. R. DAVIS.